(12) United States Patent
Wilson, Sr. et al.

(10) Patent No.: US 11,352,763 B2
(45) Date of Patent: Jun. 7, 2022

(54) AMPHIBIOUS PLATFORM VEHICLE-VESSEL

(71) Applicants: John M. Wilson, Sr., Gretna, LA (US); Dean R. Wilson, Marrero, LA (US); John M. Wilson, Jr., Youngsville, LA (US); Robert M. Wilson, Barataria, LA (US)

(72) Inventors: John M. Wilson, Sr., Gretna, LA (US); Dean R. Wilson, Marrero, LA (US); John M. Wilson, Jr., Youngsville, LA (US); Robert M. Wilson, Barataria, LA (US)

( * ) Notice: Subject to any disclaimer, the term of this patent is extended or adjusted under 35 U.S.C. 154(b) by 465 days.

(21) Appl. No.: 16/678,248

(22) Filed: Nov. 8, 2019

(65) Prior Publication Data

US 2021/0140140 A1    May 13, 2021

(51) Int. Cl.
*B60F 3/00* (2006.01)
*E02F 9/06* (2006.01)

(52) U.S. Cl.
CPC ............ *E02F 9/062* (2013.01); *B60F 3/0015* (2013.01); *B60F 3/0038* (2013.01)

(58) Field of Classification Search
CPC .......... E02F 9/062; B60F 3/00; B60F 3/0007; B60F 3/0015; B60F 3/0038
See application file for complete search history.

(56) References Cited

U.S. PATENT DOCUMENTS

| | | |
|---|---|---|
| 3,470,633 A | 10/1969 | Soehnlen |
| 3,656,449 A | 4/1972 | Mead |
| 3,842,785 A | 10/1974 | Rivet |
| 3,902,448 A | 9/1975 | Davis |
| 3,951,093 A | 4/1976 | Poche |
| 4,070,978 A | 1/1978 | Virgilio |
| 4,310,975 A | 1/1982 | Bibaut |
| 4,312,762 A | 1/1982 | Blackburn et al. |

(Continued)

FOREIGN PATENT DOCUMENTS

| | | |
|---|---|---|
| CN | 2031016 U | 1/1989 |
| JP | H 0654018 B2 | 7/1994 |

(Continued)

*Primary Examiner* — Stephen P Avila
(74) *Attorney, Agent, or Firm* — Keaty Law Firm LLC

(57) ABSTRACT

An amphibious platform vehicle-vessel to support and to move hydraulically operated and controlled earth-moving and lifting equipment, such as excavators and cranes, on solid ground, semi-solid or marshy ground, shallow water, and deeper water. The modular units can be transported to a worksite on separate trailers and assembled and reconfigured on site. Two compartmented pontoon units are mounted to an adaptive cross member that can accommodate different types of moving-lifting equipment through different mounting flanges, and to auxiliary cross members. Propulsion is provided through amphibious cleats on drive chains in chain tracks driven by dual-motor driving drums and over a tension-adjusting passive chain roller, surrounding a sealed pontoon shell internally reinforced with bulkhead partitions, beam shell-bottom stiffeners, and pressed-angle shell-bottom stiffeners. An extendable auxiliary float can be extended outward from each compartmented pontoon for increased stability in floating operations.

20 Claims, 8 Drawing Sheets

(56) References Cited

U.S. PATENT DOCUMENTS

| | | | |
|---|---|---|---|
| 4,399,623 A | 8/1983 | Neumann | |
| 4,658,751 A | 4/1987 | Koot | |
| 4,713,896 A | 12/1987 | Jennens | |
| 4,817,554 A | 4/1989 | Prestenbach | |
| 4,846,092 A | 7/1989 | Wilson | |
| 5,311,682 A | 5/1994 | Sturdivant | |
| 5,379,709 A * | 1/1995 | Wilkerson | B62D 55/06 440/12.64 |
| 5,509,370 A | 4/1996 | Kovacs et al. | |
| 5,511,508 A | 4/1996 | Wilson, Sr. et al. | |
| 5,740,875 A | 4/1998 | Wilson, Sr. et al. | |
| 5,791,074 A | 8/1998 | Pryor | |
| 5,899,164 A | 5/1999 | Coast | |
| 5,938,183 A | 8/1999 | Kissick | |
| 6,273,767 B1 | 8/2001 | Mustonen | |
| 6,315,622 B1 | 11/2001 | Wilson, Sr. et al. | |
| 6,482,053 B1 | 11/2002 | Prestenbach | |
| 6,918,801 B2 | 7/2005 | Wilson, Jr et al. | |
| 6,922,922 B2 | 8/2005 | Cheramie | |
| 7,588,106 B2 * | 9/2009 | Koskinen | E02F 9/024 440/12.63 |
| 7,849,942 B2 | 12/2010 | Wilson et al. | |
| 2002/0112460 A1 | 8/2002 | Penny | |
| 2005/0014425 A1 * | 1/2005 | Wilson | B60F 3/0015 440/12.63 |

FOREIGN PATENT DOCUMENTS

| | | |
|---|---|---|
| JP | 2003105797 A | 4/2003 |
| KR | 20200102687 A | 9/2020 |
| WO | WO 2012167694 A1 | 12/2012 |

* cited by examiner

AMPHIBIOUS PLATFORM VEHICLE-VESSEL

BACKGROUND OF THE INVENTION

This invention provides an amphibious platform vehicle-vessel to support and to move hydraulically operated and controlled earth-moving and lifting equipment, such as excavators and cranes, on solid ground, semi-solid or marshy ground, shallow water, and deeper water.

Amphibious vehicles, known as marsh buggies, were first developed to support oil and gas exploration operations conducted in marshy or swampy terrain. Marsh buggies typically include a pair of pontoons connected to a center platform. The pontoons are usually surrounded by a cleated track system which is capable of engaging ground, water, or swamp land to propel the vehicle. The track system uses one or more endless chains surrounding the periphery of each pontoon. The endless chains, supporting the cleated tracks, are driven about the periphery of the pontoons, by a sprocket or other means, in order to provide propulsion to the vehicle. By varying the track speed around each pontoon, the vehicle can be advanced, turned, or reversed.

Marsh buggies are ideal for operation in wetlands, marshlands, and other low-lying areas because of the relatively low pressures exerted on the ground through the large, tracked pontoons. Therefore, marsh buggies will not sink into the soft soil in low-lying or submerged areas and have minimal environmental impact while traveling to and from a remote job site. Marsh buggies have been adapted to haul personnel and cargo as well as serve as the operating platform for various types of equipment, such as excavators, draglines, and backhoes.

Marsh buggies are used to support heavy earth-moving equipment in low-lying, soft terrain areas for operations such as wetland restoration, crust management (dewatering), dredging, levee building, coastal erosion, and other environmental remediation operations.

Marsh buggies have proved useful in performing earth moving operations in soft-terrain and are often capable of floating in order to navigate small bodies of water. Although marsh buggies are often capable of moving through any terrain, these vehicles aren't designed to operate while floating in water deeper than their pontoons. Thus, marsh buggies are limited in performing earth-moving operations to dry land or relatively shallow water where their pontoons are resting on the ground. In deeper water, the pushing and pulling forces exerted by the excavation equipment will instead push or pull the marsh buggy itself across the surface of the water.

Marsh buggies can support earth-moving operations in somewhat deeper water through the use of spuds, which are a form of pilings that can be extended downward to rest on or in the ground under the water. Deployment of such spuds can fix the marsh buggy in place against the pushing and pulling forces of the excavation operations. Presently, deployment and retracting of the spuds can be a cumbersome process, especially under circumstances where spuds become stuck in muddy ground. The use of spuds significantly slows down the ability to advance operations across a large area. Spuds are effective for preventing movement across the water surface but are less effective in stabilizing against rocking motion caused either by swelling of the water surface or by operation of the excavation equipment.

Different moving-lifting equipment, while being similar in being hydraulically operated, requires different mounting hardware, making changing from one piece of equipment to another a complex endeavor that is difficult to accomplish at a remote worksite.

Marsh buggies are able to propel themselves and their attached equipment around a worksite, but must first be transported to the worksite, which is usually remotely located. Such transport often involves some use of public roads and highways, which impose limitations of size and weight, which in turn might require partial disassembly of large heavy equipment and then reassembly at a remote and inconvenient worksite What is needed is an amphibious platform vehicle-vessel providing hydraulically powered operation of spuds by the equipment operator through a control inside the cab, providing better stability in deeper water, providing a modular structure allowing transport as modular sections and allowing on-site assembly and on-site mounting to different moving-lifting equipment, and providing other improvements and efficiencies.

SUMMARY OF THE INVENTION

This invention provides an amphibious platform vehicle-vessel to support and to move hydraulically operated and controlled earth-moving and lifting equipment, such as excavators and cranes, on solid ground, semi-solid or marshy ground, shallow water, and deeper water. The modular units can be transported to a worksite on separate trailers and assembled and reconfigured on site. Two compartmented pontoon units are mounted to an adaptive cross member which can accommodate different types of moving-lifting equipment through different mounting flanges, and to auxiliary cross members. Propulsion is provided through amphibious cleats on drive chains in chain tracks driven by dual-motor driving drums and over a tension-adjusting passive chain roller, surrounding a sealed pontoon shell internally reinforced with bulkhead partitions, beam shell-bottom stiffeners, and pressed-angle shell-bottom stiffeners. An extendable auxiliary float can be extended outward from each compartmented pontoon for increased stability in floating operations. Spud units having a chain-drive spud and a spud-driving mount unit with spud-mount wear strips are hydraulically raised and lowered by a spud-driver motor at the command of the equipment operator using a spud-control switch.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
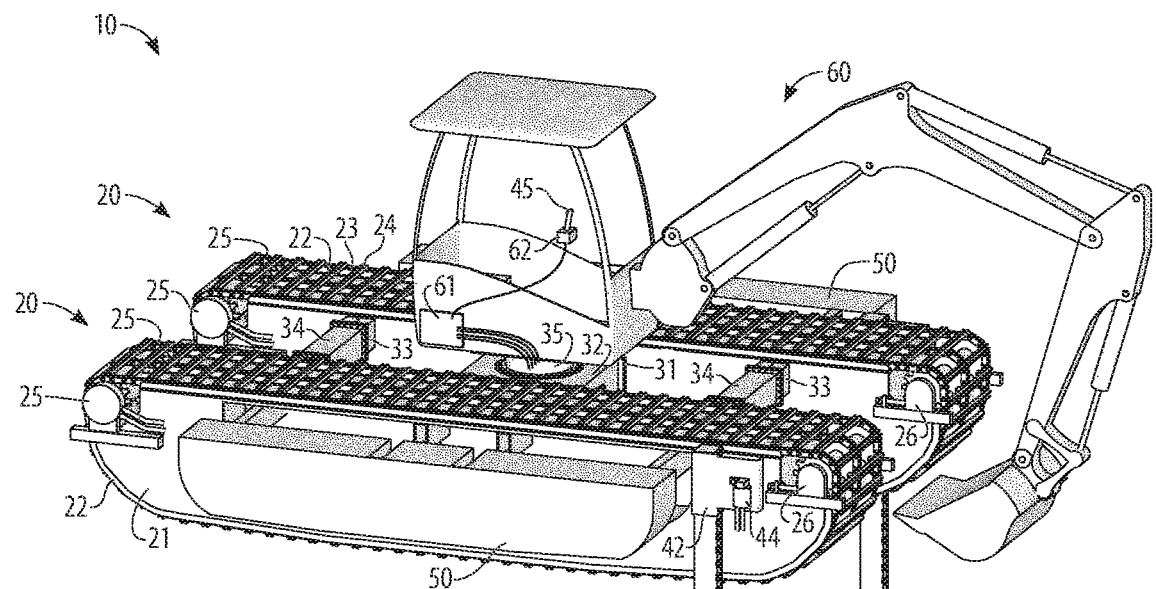
FIG. 1 is a perspective view of the amphibious platform vehicle-vessel of the invention, in use, with spud units extended downward and extendable auxiliary floats extended outward.
Figure 2:
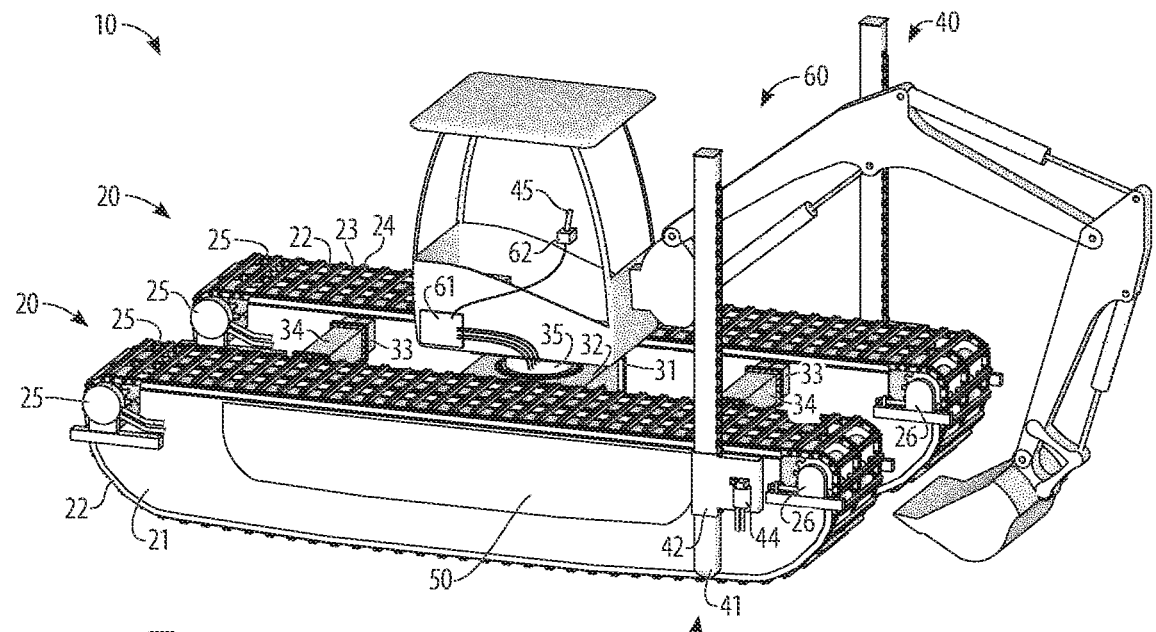
FIG. 2 is a perspective view of the amphibious platform vehicle-vessel of the invention, in use, with spud units retracted upward and extendable auxiliary floats retracted inward.

Referring to FIG. 1 and FIG. 2, the amphibious platform vehicle-vessel 10 provides for the use of moving-lifting equipment 60 on solid ground, semi-solid or marshy ground, shallow water, and deeper water. The moving-lifting equipment 60 can be of an excavator or backhoe type, as illustrated, or of a crane type. The different types and brands of moving-lifting equipment have different physical mounting configurations, and the amphibious platform vehicle-vessel 10 is adaptable to different equipment, as treated below. The amphibious platform vehicle-vessel 10 is modular and can be transported to or from a worksite as separate modules of size and weight appropriate to fit onto a truck trailer operating on existing roads and highways. The amphibious platform vehicle-vessel 10 provides for movement of mounted moving-lifting equipment 60 around a worksite, including movement between solid, marshy, and water surfaces.

The moving-lifting equipment 60 is hydraulically operated and has an equipment hydraulic controller 61 having a number of channels, and an equipment operator control 62, often in the form of a joystick inside an operator's cab, through which the equipment operator controls the hydraulic pressure directed by the equipment hydraulic controller 61 to the various parts of the moving-lifting equipment 60. The amphibious platform vehicle-vessel 10 provides an additional spud-control switch 45 allowing powered deploying and retracting of spuds, as treated below.

The amphibious platform vehicle-vessel 10 provides two compartmented pontoons 20, each having a sealed pontoon shell 21, which are mounted to an adaptive cross member 32 and to two auxiliary cross members 34, all together forming a platform for the moving-lifting equipment 60. In the illustrated embodiment, an excavator is mounted to the adaptive cross member 32 through an excavator-equipment mounting flange 35.

Each compartmented pontoon 20 provides an extendable auxiliary float 50 which can be retracted into the pontoon when not needed or when being transported, and can be extended out from the pontoon when needed in sufficiently deep water to float the amphibious platform vehicle-vessel 10, where the extended extendable auxiliary float 50 will stabilize against rocking motion and will provide better counteracting leverage against the forces resulting from use and movement of the moving-lifting equipment 60. The sealed pontoon shell 21 remains sealed and airtight even when the extendable auxiliary float 50 is extended.

One or more spud units 40 are provided, which can be deployed downward past the bottom of the pontoons to contact or to partially penetrate the ground surface such as a marshy ground surface or the bed surface underneath water. The deployed spuds provide anchoring and stability to compensate for the stability lost when the bottom surface of the pontoon floats away from solid contact with the ground. The spud units 40 can be retracted upward above the bottom of the pontoons when not needed. The amphibious platform vehicle-vessel 10 provides for deployment and retracting of the spud units 40 via the spud-control switch 45, by the operator from the cab of the moving-lifting equipment.

The amphibious platform vehicle-vessel 10 provides for movement across the ground, marsh, or water surface by providing drive chains 23, in loops, traveling in chain tracks 22, having attached amphibious cleats 24, driven by a dual-motor driving drum 25, with proper tension upon the loops of drive chains set and maintained through the tension-adjusting passive chain roller 26, as treated below.

In use, as illustrated, each compartmented pontoon 20 has an elongated-axial form along a forward-rearward line of travel. Each sealed pontoon shell 21 has top and side surfaces and a bottom surface along the elongated axis. When the two compartmented pontoons 20 are mounted to the adaptive cross member 32 and auxiliary cross members 34, each compartmented pontoon 20 has a nominal inward and outward side.

Figure 3:
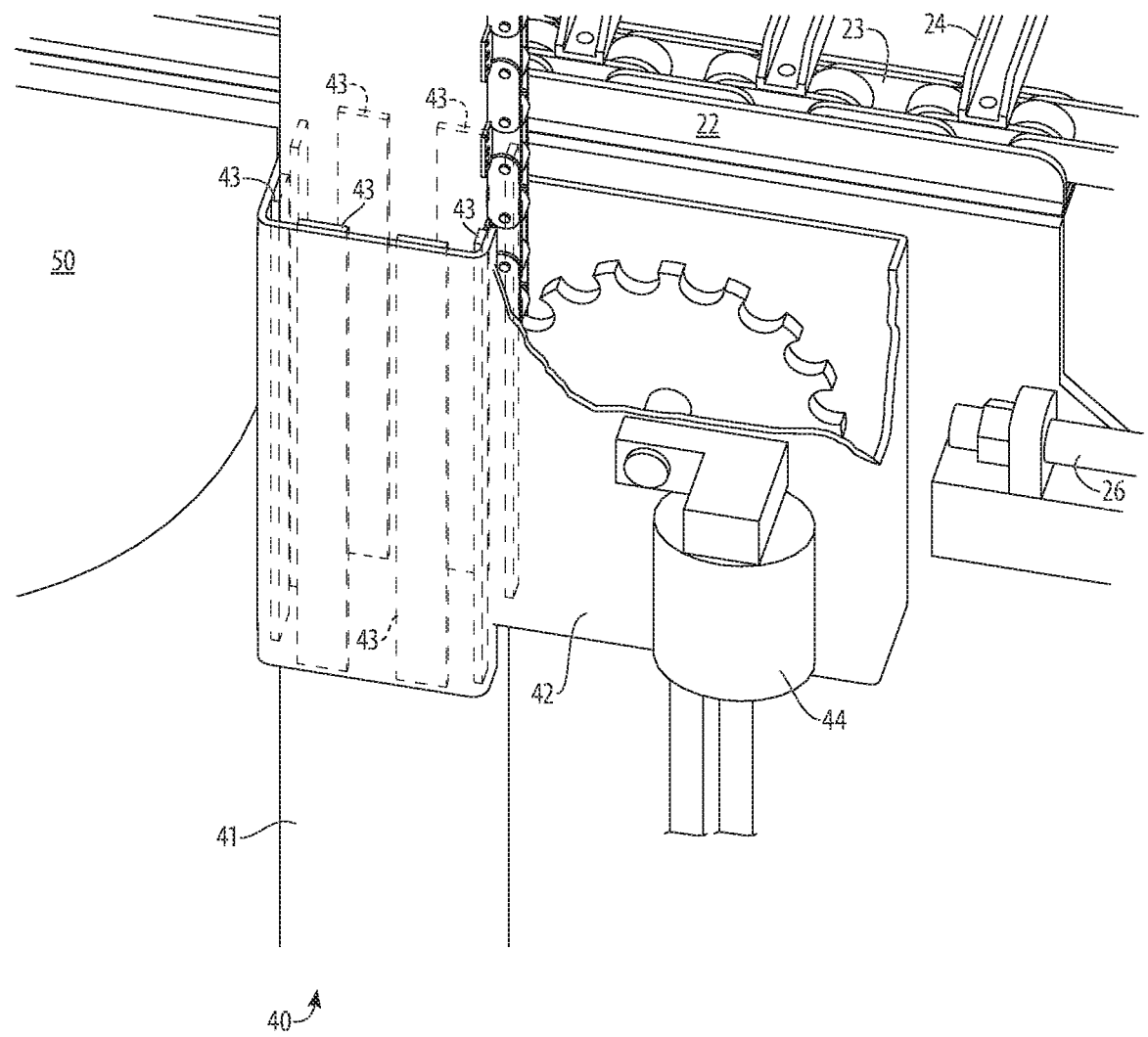
FIG. 3 is a detail view of the spud unit of the amphibious platform vehicle-vessel of the invention.

Referring to FIG. 3, the spud unit 40 provides a chain-drive spud 41 mounted upon the compartmented pontoon 20 by a spud-driving mount unit 42 that also drives the chain-drive spud 41 up and down in use. Spud-mount wear strips 43 are arrayed on the surfaces of the spud-driving mount unit 42 which are in sliding contact with the chain-drive spud 41. The spud-mount wear strips 43 provide surfaces which can be worn down with use and can be replaced easily as needed. The spud-mount wear strips 43 should be made of a material which will not abrade or wear the chain-drive spud 41, but instead will be abraded or worn. The spud-mount wear strips 43 should provide a low-friction surface resistant to the wet, dirty, and sometimes salty conditions of use. A spud-driver motor 44 provides the motive force for the spud-driving mount unit 42 to drive the chain-drive spud 41 up and down as needed and as controlled by the spud-control switch 45 treated below.

Figure 4:
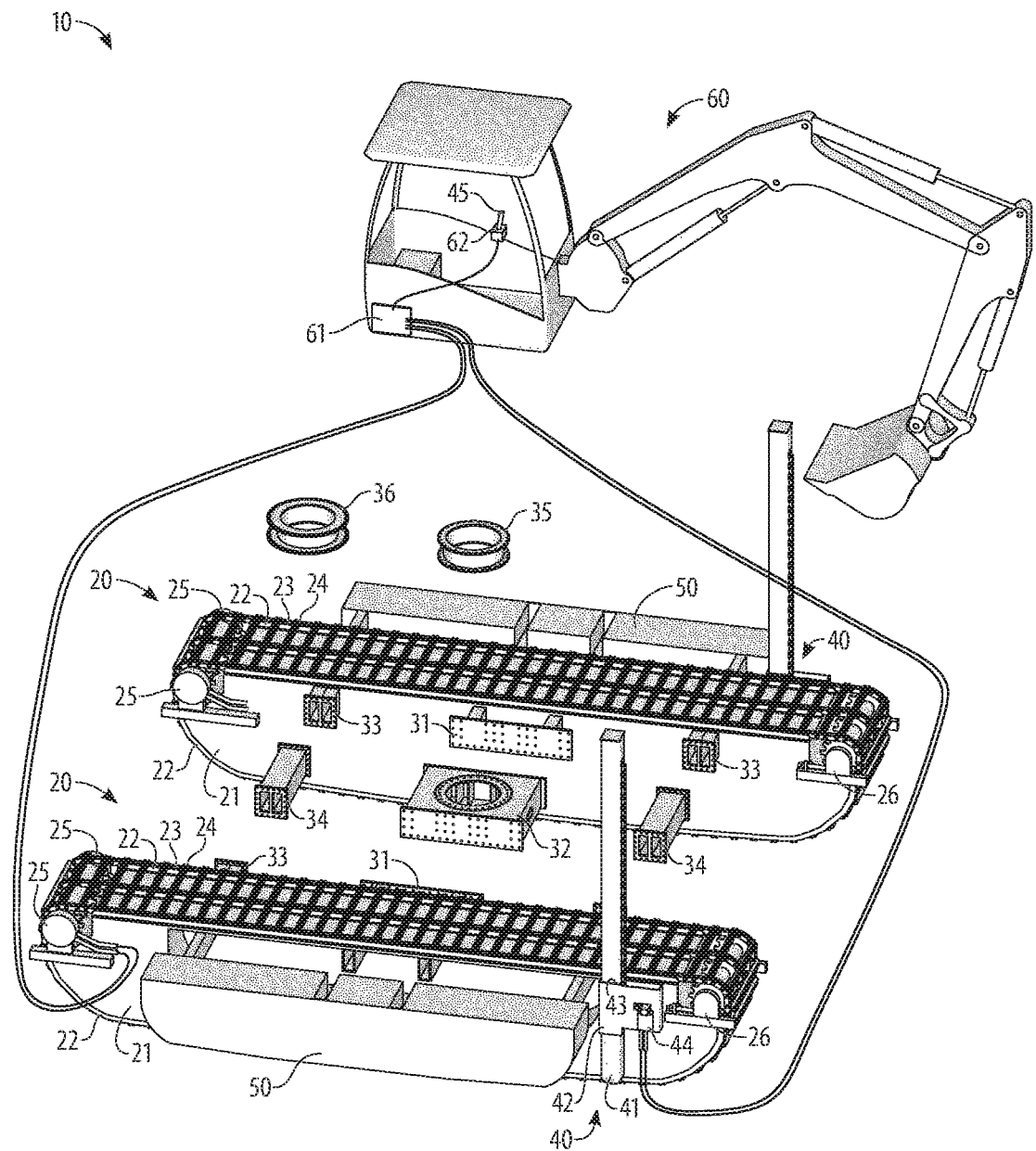
FIG. 4 is an exploded view of the amphibious platform vehicle-vessel of the invention.

Referring to FIG. 4, the spud-control switch 45 is added to the equipment operator control 62, usually in the cab of the moving-lifting equipment 60, and controls a channel of the equipment hydraulic controller 61 to exert hydraulic pressure through a pair of hydraulic lines, either differentially or uniformly, upon the spud-driver motor 44, which will move the chain-drive spud 41 either up or down, or hold the chain-drive spud 41 in place, depending upon the relative pressures in the two hydraulic lines. In this way, the spud-control switch 45 provides control of the deployment and retracting of the spuds to the equipment operator from the operator's normal location inside the cab, and without leaving the other equipment controls untended.

Referring still to FIG. 4, the amphibious platform vehicle-vessel 10 is modular, and can be taken apart for transport, with each modular compartmented pontoon 20 being of a size and shape allowing each to be transported on a truck's trailer over public roads and highways. Because the extendable auxiliary float 50 can be retracted to be substantially flush with the sealed pontoon shell 21, it does not widen the compartmented pontoon 20 module during transport or storage. After transport to a usually remote worksite, the amphibious platform vehicle-vessel 10 can be assembled and moving-lifting equipment 60 attached on-site. The amphibious platform vehicle-vessel 10 can accommodate various types of moving-lifting equipment 60, such as excavators, backhoes, cranes, gantries, concrete pumps, or specialized equipment for moving earth or for moving objects. This accommodation is achieved through the use of different mounting flanges, such as the excavator-equipment mounting flange 35 and the crane-equipment mounting flange 36 illustrated. The mounting flanges differ in their exact diameters and number, arrangement, and threading of holes. The adaptive cross member 32 provides a variety of holes of sizes and patterns to accommodate the different mounting flanges. With the appropriate excavator-equipment mounting flanges 35, 36 different moving-lifting equipment 60 can be mounted, unmounted, and remounted on the amphibious platform vehicle-vessel 10 at or near the worksite.

Figure 5:
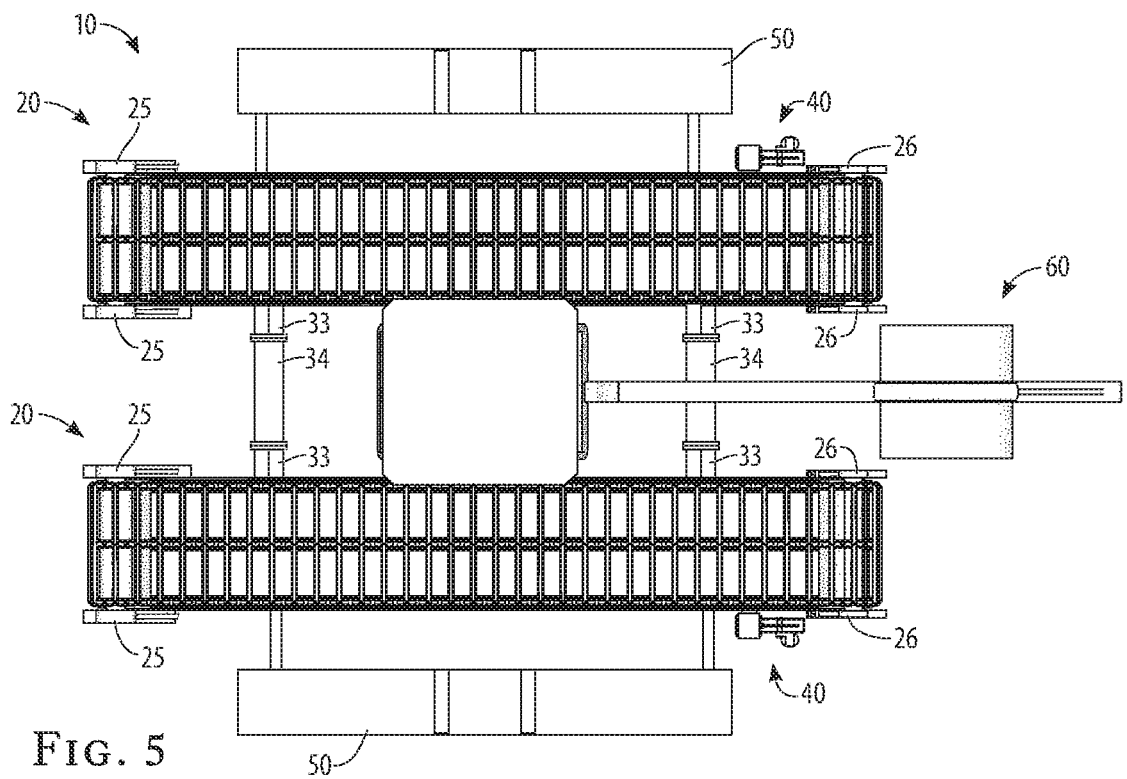
FIG. 5 is a plan view of the amphibious platform vehicle-vessel of the invention with the moving-lifting equipment installed.
Figure 6:
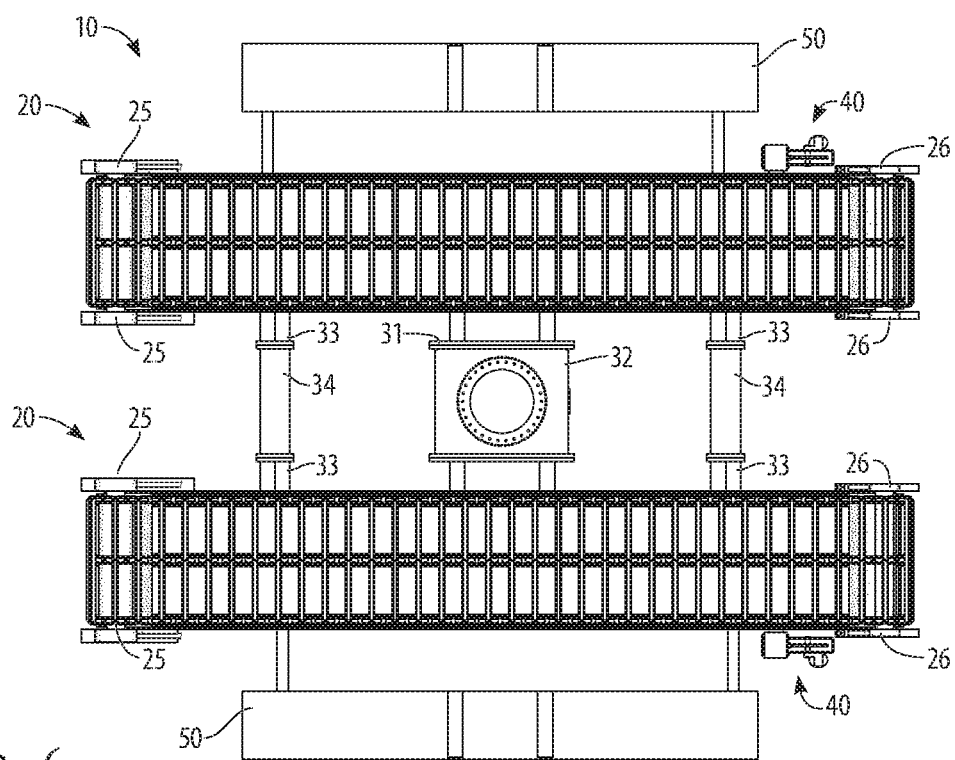
FIG. 6 is a plan view of the amphibious platform vehicle-vessel of the invention with the moving-lifting equipment not installed.

Referring to FIG. 5 and FIG. 6, the extendable auxiliary floats 50 can be extended outward from the compartmented pontoons 20 as needed in water deep enough to float the amphibious platform vehicle-vessel 10 and can be retracted into the compartmented pontoons 20 when not needed and during transport and storage. The extendable auxiliary floats 50, when extended, significantly extend the floating area outwards, which significantly stabilizes the provided platform against the forces exerted by the moving-lifting equipment 60 in operation.

Increased structural stability in all operating conditions is provided by the auxiliary cross members 34 located fore and aft of the adaptive cross member 32. The auxiliary cross members 34 accommodate portions of the beams of the extendable auxiliary floats 50 when retracted, and connect the beams to each other when extended, transferring force between the extendable auxiliary floats 50 without placing much twisting or deforming force on or through the sealed pontoon shells 21.

The compartmented pontoons 20 each provide an adaptive-cross-member mount 31 and auxiliary-cross-member mounts 33 for connection, in use, to the adaptive cross member 32 and auxiliary cross members 34.

Figures 7, 8:
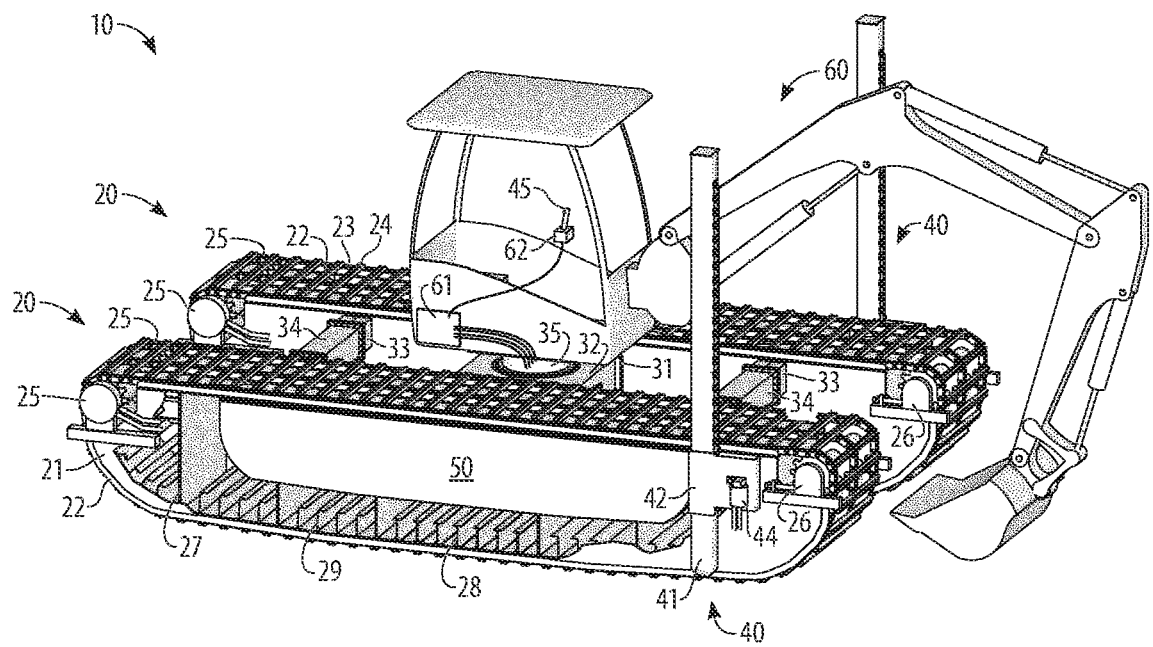
FIG. 7 is a perspective cutaway view of the amphibious platform vehicle-vessel of the invention.
FIG. 8 is a side cutaway view of the amphibious platform vehicle-vessel of the invention.

Referring to FIG. 7 and FIG. 8, each compartmented pontoon 20 further provides bulkhead partitions 27 which form separate sealed, airtight compartments inside the sealed pontoon shell 21. The extendable auxiliary float 50, when retracted, also serves as a separate sealed airtight compartment inside the boundaries of the sealed pontoon shell 21. The bulkhead partitions 27 also serve as structural bracing for the sealed pontoon shell 21. Additional support and bracing for the bottom surface of the sealed pontoon shell 21 is provided by beam shell-bottom stiffeners 28 and pressed-angle shell-bottom stiffeners 29 as illustrated, and as treated below.

Figure 9:
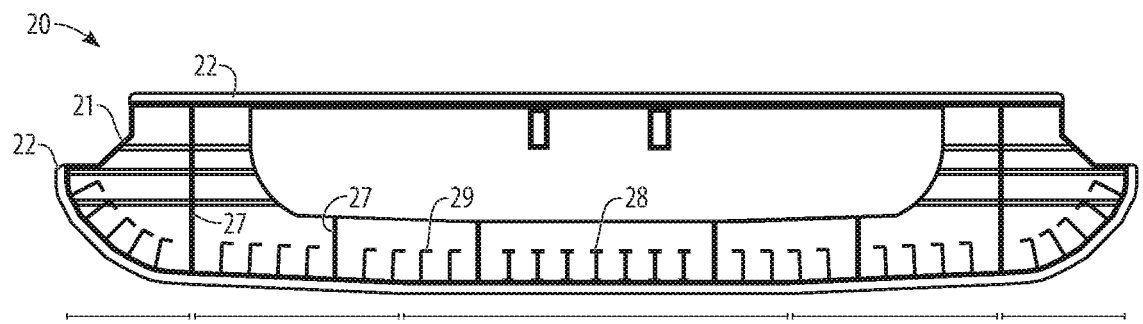
FIG. 9 is a section view of the sealed pontoon shell of the amphibious platform vehicle-vessel of the invention.

Referring to FIG. 9, along the elongated, forward-rearward axis of the bottom surface of the sealed pontoon shell 21, the bottom surface, and the chain tracks 22 along the bottom surface, have a flat profile along a central portion, rounded profiles along each end portion, and a slightly angled profile along the portions intermediate between center and ends. The slight angle along the intermediate portions can be approximately one or two degrees. In use, not in motion, on a solid ground surface, the flat central portion, directly underneath the moving-lifting equipment 60, provides support and stability. In motion, the rounded profiles along each end portion allow for approaching and climbing inclined surfaces, and the slightly angled intermediate profiles allow for a more gradual approach of the amphibious cleats 24 to the ground surface, when on solid or marshy ground, therefore applying shearing force more gradually, and at initially shallower depth, than with a longer section of flat bottom surface.

Figure 10:
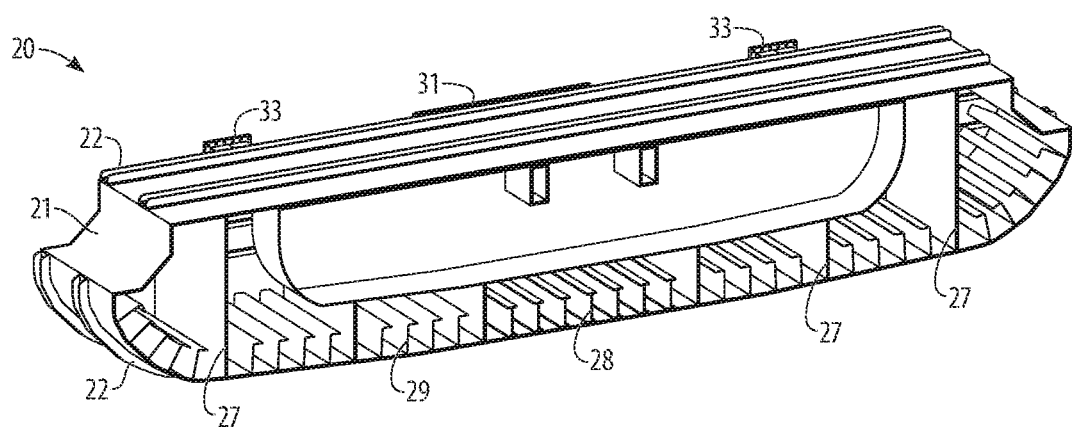
FIG. 10 is a perspective section view of the sealed pontoon shell of the amphibious platform vehicle-vessel of the invention.

Referring additionally to FIG. 10, the bottom surface of the sealed pontoon shell 21 is subject to straining force and is reinforced by beam shell-bottom stiffeners 28 and pressed-angle shell-bottom stiffeners 29. The beam shell-bottom stiffeners 28, such as sections of steel I-beam, are heavier and stronger, and are used along the central portion of the bottom surface. The pressed-angle shell-bottom stiffeners 29, such as steel bar bent on a press brake, are lighter and less expensive than the beams. Another consequence of the provided slightly angled profile of the intermediate portions of the bottom surface is a reduced amount of straining force placed upon those intermediate portions in use. Therefore, the lighter and less expensive pressed-angle shell-bottom stiffeners 29 are provided in those intermediate portions, providing sufficient reinforcement while reducing weight and expense. The pressed-angle shell-bottom stiffeners 29 are also used in the rounded-profile end portions, for the same reasons. The reduced overall weight of the compartmented pontoon 20 reduces the contact pressure with the ground, improving operating efficiency and reducing wear.

Figure 11:
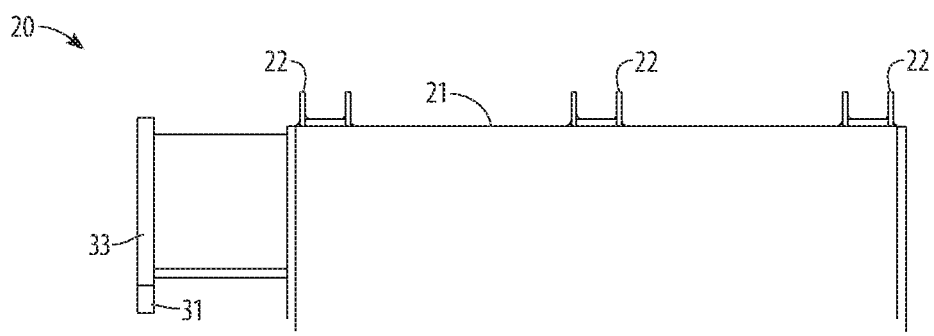
FIG. 11 is a detail view of the chain tracks of the amphibious platform vehicle-vessel of the invention.

Referring to FIG. 11, the compartmented pontoon 20 of the amphibious platform vehicle-vessel 10 provides chain tracks 22 mounted upon the outer top and bottom surfaces of the sealed pontoon shell 21. The chain tracks 22 provide a protective shield and guide for the drive chains 23 while protecting the airtight surface of the sealed pontoon shell 21. Each of the chain tracks 22 provides two vertical pieces such as A-36 steel bar material which are fillet welded onto the sealed pontoon shell 21, on the outside of the pieces, as illustrated, leaving a gap or channel for the placement of an appropriate horizontal piece such as a bar of HARDOX 400 steel bar, which is fillet welded to the inner sides of the vertical pieces as illustrated. Worn or otherwise damaged portions of the chain tracks 22 can be repaired or replaced as needed.

Figure 12:
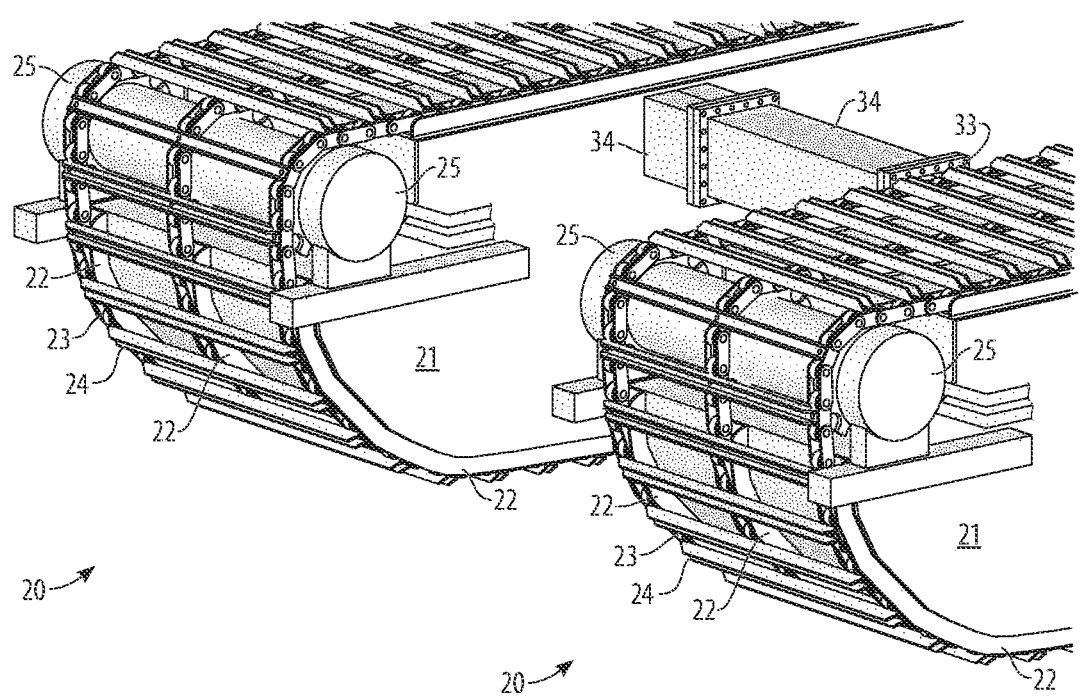
FIG. 12 is a detail view of the dual-motor driving drums of the amphibious platform vehicle-vessel of the invention.

Referring to FIG. 12, a dual-motor driving drum 25 is provided for each compartmented pontoon 20. Provision of a driving drum eliminates the use of an intermediate driving chain to drive the sprockets to drive the drive chains 23, simplifying operation and improving the handling and braking capabilities of the motor unit. Each dual-motor driving drum 25, and therefore each compartmented pontoon 20, has two hydraulic motors, providing the whole amphibious platform vehicle-vessel 10 with four motors. The normal operation of such paired hydraulic motors, when supplied from a shared pair of hydraulic lines, is to compensate for and balance each other while moving in either direction or while being held static in a braking condition.

Figure 13:
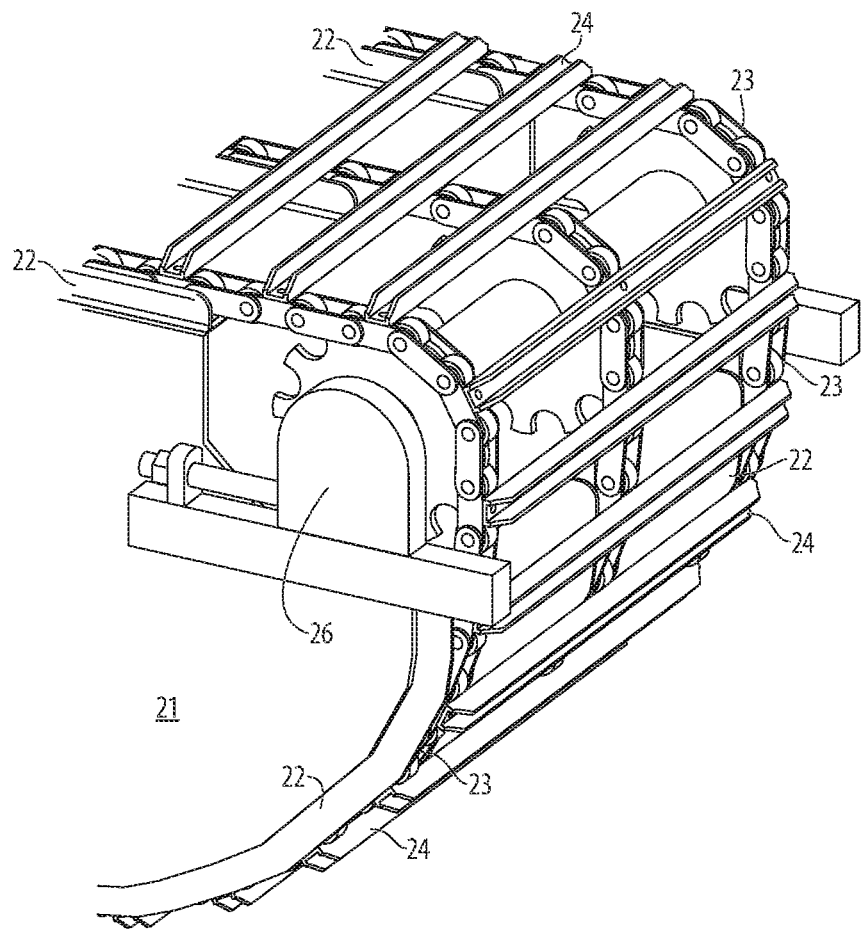
FIG. 13 is a detail view of the tension-adjusting passive chain roller of the amphibious platform vehicle-vessel of the invention.

Referring to FIG. 13, a tension-adjusting passive chain roller 26 is provided for each compartmented pontoon 20. The tension-adjusting passive chain roller 26 maintains a substantially constant tension upon the drive chains 23 to keep them within the chain tracks 22 and keep them engaged with the sprockets of the dual-motor driving drum 25. Larger and general adjustment can be made manually after repair or modification to the drive chains 23 or to adjust for extreme temperature or environmental changes, and smaller moment-to-moment adjustments during operations are made automatically.

Many other changes and modifications can be made in the system and method of the present invention without departing from the spirit thereof. We therefore pray that our rights to the present invention be limited only by the scope of the appended claims.

We claim:

1. An amphibious platform vehicle-vessel to support moving-lifting equipment having an equipment hydraulic controller and an equipment operator control, the amphibious platform vehicle-vessel comprising:
   (i) an adaptive cross member adapted for installation of moving-lifting equipment and routing of hydraulic lines;
   (ii) an excavator-equipment mounting flange adapted for installation of excavator-type moving-lifting equipment onto said adaptive cross member;
   (iii) a crane-equipment mounting flange adapted for installation of crane-type moving-lifting equipment onto said adaptive cross member;
   (iv) two auxiliary cross members adapted for added support and stability;
   (v) two compartmented pontoons, having elongated-axial form along a forward-rearward line of travel and nominal inward and outward sides in use, each compartmented pontoon comprising:
       (a) a sealed pontoon shell with top and side surfaces and a bottom surface along the elongated axis, having a flat profile along a central portion, rounded profiles along each end portion, and a slightly angled profile along the portions intermediate between center and ends;
       (b) a plurality of chain tracks arrayed axially along the top and bottom surfaces of said sealed pontoon shell, adapted to provide a hard-wearing and repairable surface protecting said sealed pontoon shell;
       (c) a plurality of drive chains, each in loop form, partially contained within and travelling within said chain tracks;
       (d) a plurality of amphibious cleats each arrayed perpendicularly across said drive chains, adapted to provide propulsive contact with solid, semi-solid, and liquid ground surfaces;
       (e) a dual-motor driving drum mounted upon said sealed pontoon shell, having sprockets engaging with said drive chains, adapted to drive said drive chains along said chain tracks, thereby moving said amphibious cleats in propulsive relation to the ground surface;
       (f) a tension-adjusting passive chain roller mounted upon said sealed pontoon shell, adapted to provide adjustable tension upon the loops of said drive chains;
       (g) a plurality of bulkhead partitions arrayed inside said sealed pontoon shell, adapted to provide structural support and to form separate airtight chambers within said sealed pontoon shell;
       (h) a plurality of beam shell-bottom stiffeners arrayed upon the interior bottom surface of said sealed pontoon shell along the central portion;
       (i) a plurality of pressed-angle shell-bottom stiffeners arrayed upon the interior bottom surface of said sealed pontoon shell along the intermediate and end portions;
       (j) an extendable auxiliary float adapted to retract into said sealed pontoon shell during transport and when not needed, and to extend from the outward side of said sealed pontoon shell when needed to provide enhanced floating stability;
       (k) an adaptive-cross-member mount positioned centrally upon the inward side of said sealed pontoon shell, adapted to mount said adaptive cross member to said sealed pontoon shell; and
       (l) two auxiliary-cross-member mounts positioned upon the inward side of said sealed pontoon shell forward and rearward of said adaptive-cross-member mount;
   (vi) at least one spud unit adapted to provide anchoring and stability when positioned downward onto or into the ground surface, and to avoid interference with movement when positioned upward above the ground surface, the spud unit comprising:
       (a) a chain-drive spud adapted to be moved downward and upward as needed;
       (b) a spud-driving mount unit adapted to mount said chain-drive spud upon said compartmented pontoon, and to drive said chain-drive spud upward and downward;
       (c) a plurality of spud-mount wear strips arrayed upon said spud-driving mount unit at the points of contact with said chain-drive spud, adapted to facilitate the smooth movement of said chain-drive spud within said spud-driving mount unit and to provide repairable and replaceable wear surfaces; and
       (d) a spud-driver motor adapted to provide motive force for said spud-driving mount unit to drive said chain-drive spud upward and downward; and
   (vii) a spud-control switch mounted upon the equipment operator control, adapted to cause the proper channel of the equipment hydraulic controller to activate said spud-driver motor to affect the desired movement of said chain-drive spud by said spud-driving mount unit.

2. The amphibious platform vehicle-vessel of claim 1, where said spud-mount wear strips are made from polytetrafluoroethylene (PTFE) material.

3. The amphibious platform vehicle-vessel of claim 1, where said spud-mount wear strips are made from high-density polyethylene (HDPE) material.

4. The amphibious platform vehicle-vessel of claim 1, where said spud-mount wear strips are made from a plastic material.

5. The amphibious platform vehicle-vessel of claim 1, where said spud-mount wear strips are made from a metal material.

6. The amphibious platform vehicle-vessel of claim 1, where said spud-mount wear strips are made from steel.

7. The amphibious platform vehicle-vessel of claim 1, where said sealed pontoon shell further comprises a slightly angled profile along intermediate portions of 1 degree.

8. The amphibious platform vehicle-vessel of claim 1, where said sealed pontoon shell further comprises a slightly angled profile along intermediate portions of 1.5 degrees.

9. The amphibious platform vehicle-vessel of claim 1, where said sealed pontoon shell further comprises a slightly angled profile along intermediate portions of 2 degrees.

10. The amphibious platform vehicle-vessel of claim 1, further comprising three said chain tracks.

11. A method of using moving-lifting equipment having an equipment hydraulic controller and an equipment operator control, at a worksite having solid, semi-solid, and liquid ground surfaces, comprising:
    (i) providing an amphibious platform vehicle-vessel comprising:

(a) an adaptive cross member adapted for installation of moving-lifting equipment and routing of hydraulic lines;
(b) an excavator-equipment mounting flange adapted for installation of excavator-type moving-lifting equipment onto said adaptive cross member;
(c) a crane-equipment mounting flange adapted for installation of crane-type moving-lifting equipment onto said adaptive cross member;
(d) two auxiliary cross members adapted for added support and stability;
(e) two compartmented pontoons, having elongated-axial form along a forward-rearward line of travel and nominal inward and outward sides in use, each compartmented pontoon comprising:
 (1) a sealed pontoon shell with top and side surfaces and a bottom surface along the elongated axis, having a flat profile along a central portion, rounded profiles along each end portion, and a slightly angled profile along the portions intermediate between center and ends;
 (2) a plurality of chain tracks arrayed axially along the top and bottom surfaces of said sealed pontoon shell, adapted to provide a hard-wearing and repairable surface protecting said sealed pontoon shell;
 (3) a plurality of drive chains, each in loop form, partially contained within and travelling within said chain tracks;
 (4) a plurality of amphibious cleats each arrayed perpendicularly across said drive chains, adapted to provide propulsive contact with solid, semi-solid, and liquid ground surfaces;
 (5) a dual-motor driving drum mounted upon said sealed pontoon shell, having sprockets engaging with said drive chains, adapted to drive said drive chains along said chain tracks, thereby moving said amphibious cleats in propulsive relation to the ground surface;
 (6) a tension-adjusting passive chain roller mounted upon said sealed pontoon shell, adapted to provide adjustable tension upon the loops of said drive chains;
 (7) a plurality of bulkhead partitions arrayed inside said sealed pontoon shell, adapted to provide structural support and to form separate airtight chambers within said sealed pontoon shell;
 (8) a plurality of beam shell-bottom stiffeners arrayed upon the interior bottom surface of said sealed pontoon shell along the central portion;
 (9) a plurality of pressed-angle shell-bottom stiffeners arrayed upon the interior bottom surface of said sealed pontoon shell along the intermediate and end portions;
 (10) an extendable auxiliary float adapted to retract into said sealed pontoon shell during transport and when not needed, and to extend from the outward side of said sealed pontoon shell when needed to provide enhanced floating stability;
 (11) an adaptive-cross-member mount positioned centrally upon the inward side of said sealed pontoon shell, adapted to mount said adaptive cross member to said sealed pontoon shell; and
 (12) two auxiliary-cross-member mounts positioned upon the inward side of said sealed pontoon shell forward and rearward of said adaptive-cross-member mount;
(f) at least one spud unit adapted to provide anchoring and stability when positioned downward onto or into the ground surface, and to avoid interference with movement when positioned upward above the ground surface, the spud unit comprising:
 (1) a chain-drive spud adapted to be moved downward and upward as needed;
 (2) a spud-driving mount unit adapted to mount said chain-drive spud upon said compartmented pontoon, and to drive said chain-drive spud upward and downward;
 (3) a plurality of spud-mount wear strips arrayed upon said spud-driving mount unit at the points of contact with said chain-drive spud, adapted to facilitate the smooth movement of said chain-drive spud within said spud-driving mount unit and to provide repairable and replaceable wear surfaces; and
 (4) a spud-driver motor adapted to provide motive force for said spud-driving mount unit to drive said chain-drive spud upward and downward; and
(g) a spud-control switch mounted upon the equipment operator control, adapted to cause the proper channel of the equipment hydraulic controller to activate said spud-driver motor to affect the desired movement of said chain-drive spud by said spud-driving mount unit;
(ii) transporting said amphibious platform vehicle-vessel to the worksite as separate modules;
(iii) assembling said amphibious platform vehicle-vessel at the worksite;
(iv) mounting moving-lifting equipment to said amphibious platform vehicle-vessel at the worksite;
(v) moving the moving-lifting equipment mounted upon said amphibious platform vehicle-vessel around the worksite;
(vi) using the moving-lifting equipment mounted upon said amphibious platform vehicle-vessel; and
(vii) controlling deployment and retracting of said spud units via said spud-control switch.

12. The method of claim 11, where said spud-mount wear strips are made from polytetrafluoroethylene (PTFE) material.

13. The method of claim 11, where said spud-mount wear strips are made from high-density polyethylene (HDPE) material.

14. The method of claim 11, where said spud-mount wear strips are made from a plastic material.

15. The method of claim 11, where said spud-mount wear strips are made from a metal material.

16. The method of claim 11, where said spud-mount wear strips are made from steel.

17. The method of claim 11, where said sealed pontoon shell further comprises a slightly angled profile along intermediate portions of 1 degree.

18. The method of claim 11, where said sealed pontoon shell further comprises a slightly angled profile along intermediate portions of 1.5 degrees.

19. The method of claim 11, where said sealed pontoon shell further comprises a slightly angled profile along intermediate portions of 2 degrees.

20. The method of claim 11, where said amphibious platform vehicle-vessel further comprises three said chain tracks.

* * * * *

UNITED STATES PATENT AND TRADEMARK OFFICE
CERTIFICATE OF CORRECTION

| | |
|---|---|
| PATENT NO. | : 11,352,763 B2 |
| APPLICATION NO. | : 16/678248 |
| DATED | : June 7, 2022 |
| INVENTOR(S) | : John M. Wilson, Sr. et al. |

It is certified that error appears in the above-identified patent and that said Letters Patent is hereby corrected as shown below:

On the Title Page

Item (72) Name of inventor and applicant "Robert M. Wilson" should be changed to -- Robert A. Wilson --.

Signed and Sealed this
Ninth Day of August, 2022

*Katherine Kelly Vidal*
Katherine Kelly Vidal
*Director of the United States Patent and Trademark Office*